United States Patent
Tokuhiro et al.

(10) Patent No.: US 7,346,544 B2
(45) Date of Patent: Mar. 18, 2008

(54) METHOD FOR SELLING ITEMS USING A NETWORK

(75) Inventors: Taro Tokuhiro, Shizuoka-ken (JP); Seiichi Yamaguchi, Shizuoka-ken (JP); Hisanori Murakami, Shizuoka-ken (JP)

(73) Assignee: Yamaha Corporation, Hamamatsu-Shi (JP)

( * ) Notice: Subject to any disclaimer, the term of this patent is extended or adjusted under 35 U.S.C. 154(b) by 731 days.

(21) Appl. No.: 09/824,483

(22) Filed: Mar. 30, 2001

(65) Prior Publication Data

US 2002/0087425 A1 Jul. 4, 2002

(30) Foreign Application Priority Data

Dec. 28, 2000 (JP) ............................. 2000-402436

(51) Int. Cl.
*G06Q 30/00* (2006.01)
(52) U.S. Cl. .......................... 705/26; 705/27; 705/57
(58) Field of Classification Search .................. 705/26, 705/27, 57
See application file for complete search history.

(56) References Cited

U.S. PATENT DOCUMENTS

| | | | |
|---|---|---|---|
| 5,724,424 A | 3/1998 | Gifford | |
| 5,895,454 A | 4/1999 | Harrington | |
| 5,960,411 A | 9/1999 | Hartman et al. | |
| 5,966,697 A * | 10/1999 | Fergerson et al. | 705/26 |
| 6,587,835 B1 * | 7/2003 | Treyz et al. | 705/14 |
| 6,643,624 B2 * | 11/2003 | Philippe et al. | 705/26 |
| 2002/0032579 A1 * | 3/2002 | Harpale | 705/1 |
| 2004/0254855 A1 * | 12/2004 | Shah | 705/26 |
| 2006/0069926 A1 * | 3/2006 | Ginter et al. | 713/194 |

FOREIGN PATENT DOCUMENTS

| | | |
|---|---|---|
| EP | 0 845 749 | 6/1998 |
| GB | 2 352 856 | 2/2001 |
| JP | 6-141100 | 5/1994 |
| JP | 9-330354 | 12/1997 |

(Continued)

OTHER PUBLICATIONS

Lewis, Ira, "Third party logistics: Leveraging information technology" Journal of Business Logistics, dated 2000.*
eBay (www.ebay.com) Apr. 28, 1999, shown at http://web.archive.org/web/19990428111841/http://www.ebay.com/.
Bidbay (www.bidbay.com) Aug. 15, 2000 shown at http://web.archive.org.20000815075137/www2.bidbay.com/.
Yahoo! Auctions (Auctions.yahoo.com.au) Feb. 19, 2000 shown at http://web.archive.org/web/20001109170500/au.auctions.yahoo.com/au/.

*Primary Examiner*—Mark Fadok
(74) *Attorney, Agent, or Firm*—Morrison & Foerster LLP (57) ABSTRACT

Various items are sold through the Internet 10 which contains a site computer 20, vendor computers 30a, 30b, factory computers 40a, 40b, dealer computers 50a, 50b, and user computers 60a, 60b, 60c. General users access to the site computer 20 to purchase items dealt in by vendors belonging to various countries using the user computers 60a, 60b, 60c connected to the Internet 10. When the site computer 20 accepts an instruction of purchasing physical items, the site computer 20 instructs the vendor computers 30a, 30b in various countries to send out the physical items to the general users. Download items which can be downloaded are downloaded from the site computer 20 to the user computers 60a, 60b, 60c. When the vendor does not have the physical items in stock, the site computer 20 instructs the factory computers 40a, 40b to make and send out the items. The site computer 20 can be accessed from a dealer computer for purchasing items.

7 Claims, 9 Drawing Sheets

FOREIGN PATENT DOCUMENTS

| | | |
|---|---|---|
| JP | 10-162066 | 6/1998 |
| JP | 11-31184 | 2/1999 |
| JP | 11-250129 | 9/1999 |
| KR | 2000-0063373 | 11/2000 |
| WO | WO99/52042 | 10/1999 |
| WO | WO 00/21006 | 4/2000 |
| WO | WO 00/31657 * | 6/2000 |
| WO | WO 01/27837 | 4/2001 |

* cited by examiner

| Item Catalogue | | | | | |
|---|---|---|---|---|---|
| 'ABC' Retrieval Result | | | | | |
| Name of Item | Artist | Form | Price | Vendor | Cart |
| ABC MIDI Collection | ABC | FD | $20 | US Vendor | ☑ |
| ABC MIDI Collection | ABC | Download | $20 | UK Vendor | ☐ |
| ABC MIDI Piano Score | ABC | Download | $15 | US Vendor | ☑ |
| ABC Piano Score | ABC | Book | $18 | US Vendor | ☐ |
| ABC Band Score | ABC | Book | $25 | US Vendor | ☑ |

ORDER

METHOD FOR SELLING ITEMS USING A NETWORK

BACKGROUND OF THE INVENTION

1. Field of the Invention

The present invention relates to a method for selling items using a network which contains a site computer, vendor computers, factory computers, dealer computers and user computers.

2. Description of the Related Art

Conventionally, online sales systems using a web site in the Internet are well known. However, in such conventional sales systems, web sites are separated by countries and, when a general user wants to purchase items made and sold both in one country and in another country, the general user must access to the web sites in each country, resulting in an annoyance for the general user.

The items to be sold include physical items composed of material beings and download items composed of data and, even for the same content, there exist a physical item (a musical score printed on papers, for example) and a download item (an electronic musical score composed of data representing a musical score, for example). However, these items are sold at different web sites and the general user must choose a web site according to the form the general user wants to purchase.

Also, a dealer who is not a general user cannot place an order to a web site with ease. Moreover, when the company which sends out the physical item ordered at the web site does not have the item in stock, the general user must wait for a long time until the item arrives.

SUMMARY OF THE INVENTION

The present invention has been made to cope with the above problems, and it is the object of the present invention to provide a site or vendor computer which can solve the problems for the convenience of general users, a record medium in which a program used in the computer has been stored and a method for selling items using the computer.

With a view to accomplishing the above object, the first feature of the present invention is that a site computer communicable through a network with a first vendor computer of a first vendor belonging to a first country, a second vendor computer of a second vendor belonging to a second country different from the first country and a user computer used by a general user, the site computer executes the steps of: enabling simultaneous designation of items respectively sold by the first and second vendors from the user computer by the general user, and instructing the first and second vendor computers to send out the items to the general user under conditions of the simultaneous designation of the items respectively sold by the first and second vendors from the general user.

Thereby, the general user can purchase items each dealt in by a plurality of vendors (publishing companies, for example) belonging to different countries together at one web site, and the items are sent out to the general user from each of the plurality of vendors. Therefore, the general user can easily purchase various items irrespective of the countries to which the vendors belong and can obtain the items without delay.

The second feature of the present invention is that a site computer communicable through a network with a vendor computer of a vendor selling items including a physical item composed of material beings and a download item composed of data and a user computer used by a general user, the site computer executes the steps of: enabling simultaneous designation of the physical item and the download item from the user computer by the general user, wherein the download item has been stored, and downloading the download item to the user computer and instructing the vendor computer to send out the physical item to the general user under conditions of the simultaneous designation of the physical item and the download item from the general user.

Thereby, the general user can purchase a physical item (a musical score printed on papers, for example) and a download item (an electronic musical score, for example) together at one web site, and the download item is downloaded at once and the physical item is sent out by the vendor. Therefore, the general user can easily purchase various items irrespective of the form thereof, and can immediately obtain a download item in particular.

The third feature of the present invention is that a site computer communicable through a network with a vendor computer of a vendor selling an item, a user computer used by a general user and a dealer computer used by a dealer, the site computer executes the steps of: determining whether a logged-in computer is the user computer or the dealer computer based on identification data thereof, accepting designation of an item from the logged-in computer by the general user and instructing the vendor computer to send out the designated item to the general user under conditions that the logged-in computer is the user computer, and transferring the designation of the item from the logged-in computer by the dealer to the vendor computer under conditions that the logged-in computer is the dealer computer.

Thereby, orders from both general users and dealers can be dealt with at one site, and the orders from general users are accepted at the site and the orders from dealers are transferred to vendors. Therefore, the dealers can easily order items at the site even though the vendor does not set up another site for the dealers, and the site can also expect a lot of orders from the dealers.

The fourth feature of the present invention is that a site computer communicable through a network with a vendor computer of a vendor selling an item, a factory computer of a maker making the item sold by the vendor and a user computer used by a general user, the site computer executes the steps of: accepting designation of the item from the user computer by the general user, confirming whether the vendor has the designated item in stock or not through communication with the vendor computer, instructing the vendor computer to send out the designated item to the general user under conditions that the vendor has the designated item in stock, and instructing the factory computer to send out the designated item to the general user under conditions that the vendor does not have the designated item in stock.

Thereby, if the vendor does not have an ordered physical item in stock, an order is immediately placed directly with the maker who can make the item and the time taken to deliver the item to the general user is shortened. Therefore, the general user can obtain various items immediately without waiting for a long time until the items arrive.

The fifth feature of the present invention is that a vendor computer of a vendor selling an item, communicable through a network with a user computer used by a general user, a site computer accessed from the user computer and a factory computer of a maker making the item, the vendor computer executes the steps of: accepting designation of the item via the site computer based on designation thereof from the user computer by the general user, confirming whether the designated item is in stock or not, executing a process for sending out the designated item to the general user under conditions that the designated item is in stock, and instructing the factory computer to make the designated item under conditions that the designated item is out of stock.

Thereby, if the vendor does not have an ordered physical item in stock, the vendor computer also immediately instructs the maker making the item to make the item and the time taken to deliver the item to the general user is shortened. Therefore, the general user can immediately obtain various items without waiting for a long time until the items arrive.

BRIEF DESCRIPTION OF THE DRAWINGS

For better understanding of the above and other features of the present invention, the preferred embodiments of the invention will be described in greater detail below with reference to the accompanying drawings, in which.

DETAILED DESCRIPTION OF THE PREFERRED EMBODIMENT

Figure 1:
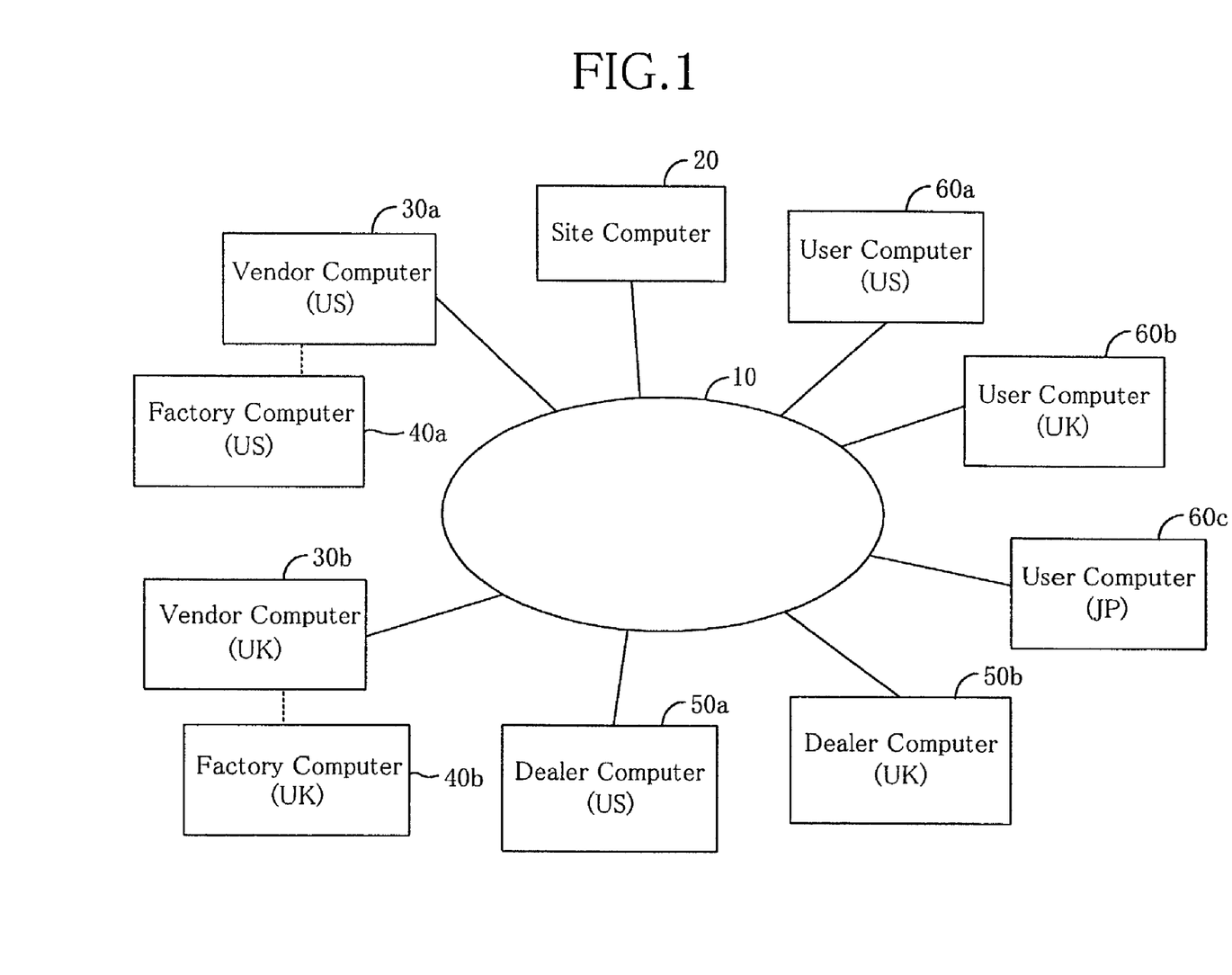
FIG. 1 is a general schematic view of a system for selling items according to one embodiment of the present invention.

Referring now to the drawings, one embodiment of the present invention will be hereinafter described. FIG. 1 shows a system for selling items consisting of music contents according to the embodiment. The sales system utilizes the Internet 10, to which a site computer 20, vender computers 30a, 30b. . . , factory computers 40a, 40b. . . , dealer computers 50a, 50b. . . , and user computers 60a, 60b, 60c. . . , are connected so as to communicate with each other through telephone lines, dedicated lines, LAN and so on.

The site computer 20 is disposed in one specific country to constitute a web site which executes sales of items, an instruction for sending out the items and item management. The vendor computers 30a, 30b. . . exist in a plurality of countries one or more each and each belongs to a vendor selling items to general users. The vendors stocks physical items (so-called hard items) composed of material beings, such as CDs in which music is stored, FDs or CDs in which data of musical compositions are stored and musical scores printed on papers, and sends out the items ordered by general users or dealers to the general users or the dealers by post or delivery service according to an instruction of delivery from the site computer 20 to the vendor computer 30a, 30b . . .

The factory computers 40a, 40b. . . are provided correspondingly to the vendor computers 30a, 30b. . . , respectively, and each belongs to a maker making the items sold by each of the vendors. The dealer computers 50a, 50b. . . belong to dealers who mediate between general users (general customers) and vendors to purchase items from the venders and sell the items to the general users. The user computers 60a, 60b, 60c. . . are owned by the general users (general customers) who purchase the items.

Figure 2:
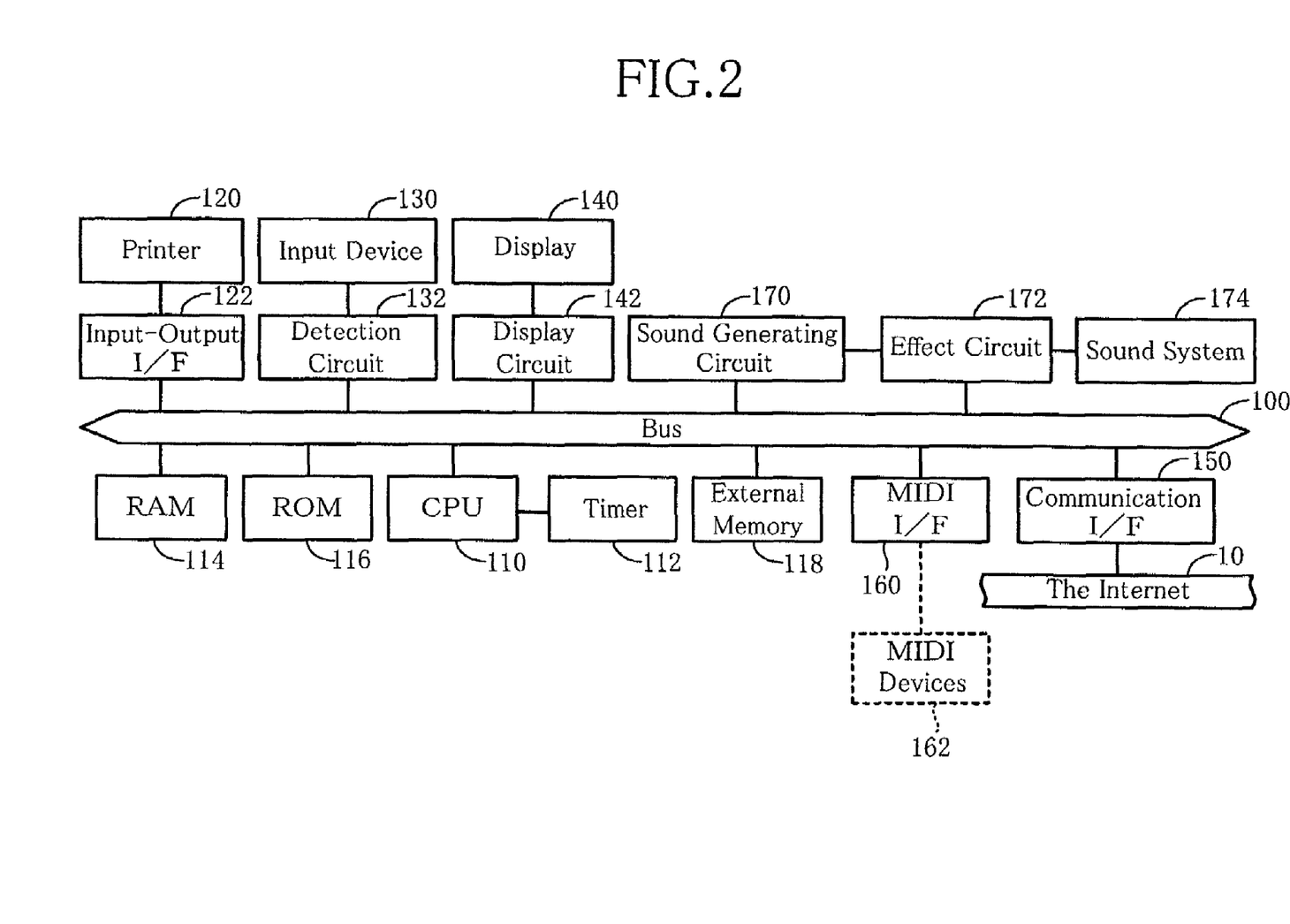
FIG. 2 is a block diagram illustrating an concrete example of constitution of each of the computers in FIG. 1.

As shown in FIG. 2, each of the computers 20, 30a, 30b. . . , 40a, 40b. . . , 50a, 50b. . . , 60a, 60b, 60c. . . contains a CPU 110, a timer 112, a RAM 114, a ROM 116 and an external memory 118 which are connected to a bus 100 to constitute a computer body.

The CPU 110 executes a program to control communication with other computers through the Internet 10. The timer 112 is instructed by the CPU or the like to measure the time required to execute the program. The RAM 114 temporally stores variables inputted or calculated through the execution of the program and a part of the program which has been stored in the external memory 118 and is transferred therefrom when executed. The ROM 116 stores constants and a part of the program necessary to execute the program.

The external memory 118 comprises a drive device, a hard disk HD incorporated in the drive device, and a compact disk CD and a flexible disk FD selectively incorporated in the drive device and so on. The hard disk HD, the compact disk CD and the flexible disk FD store constants necessary to execute the program and all or a part of the program, and valuables inputted or calculated through the execution of the program.

Figure 3:
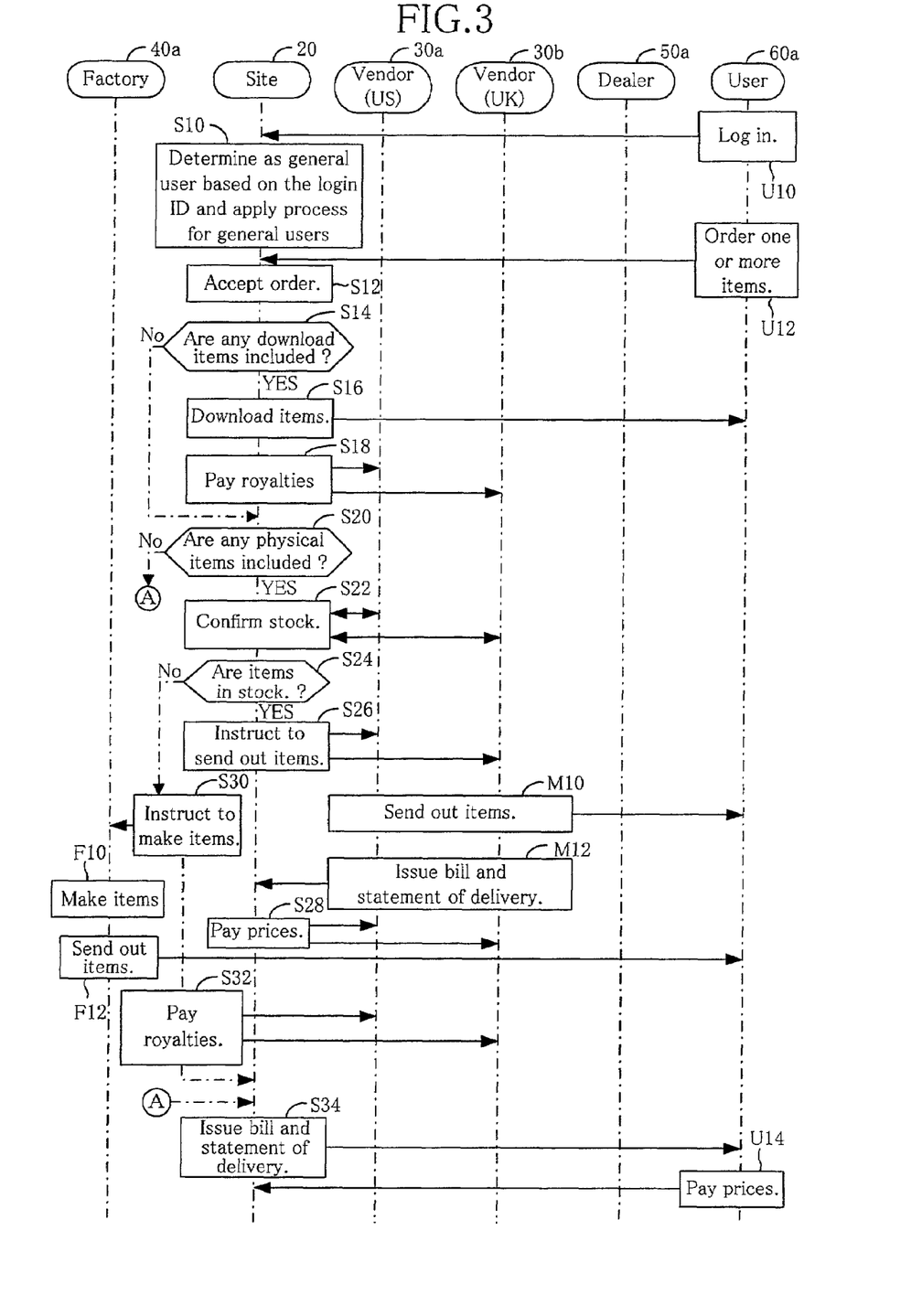
FIG. 3 is a flowchart illustrating a part of the program executed by the computers in FIG. 1.
Figure 4:
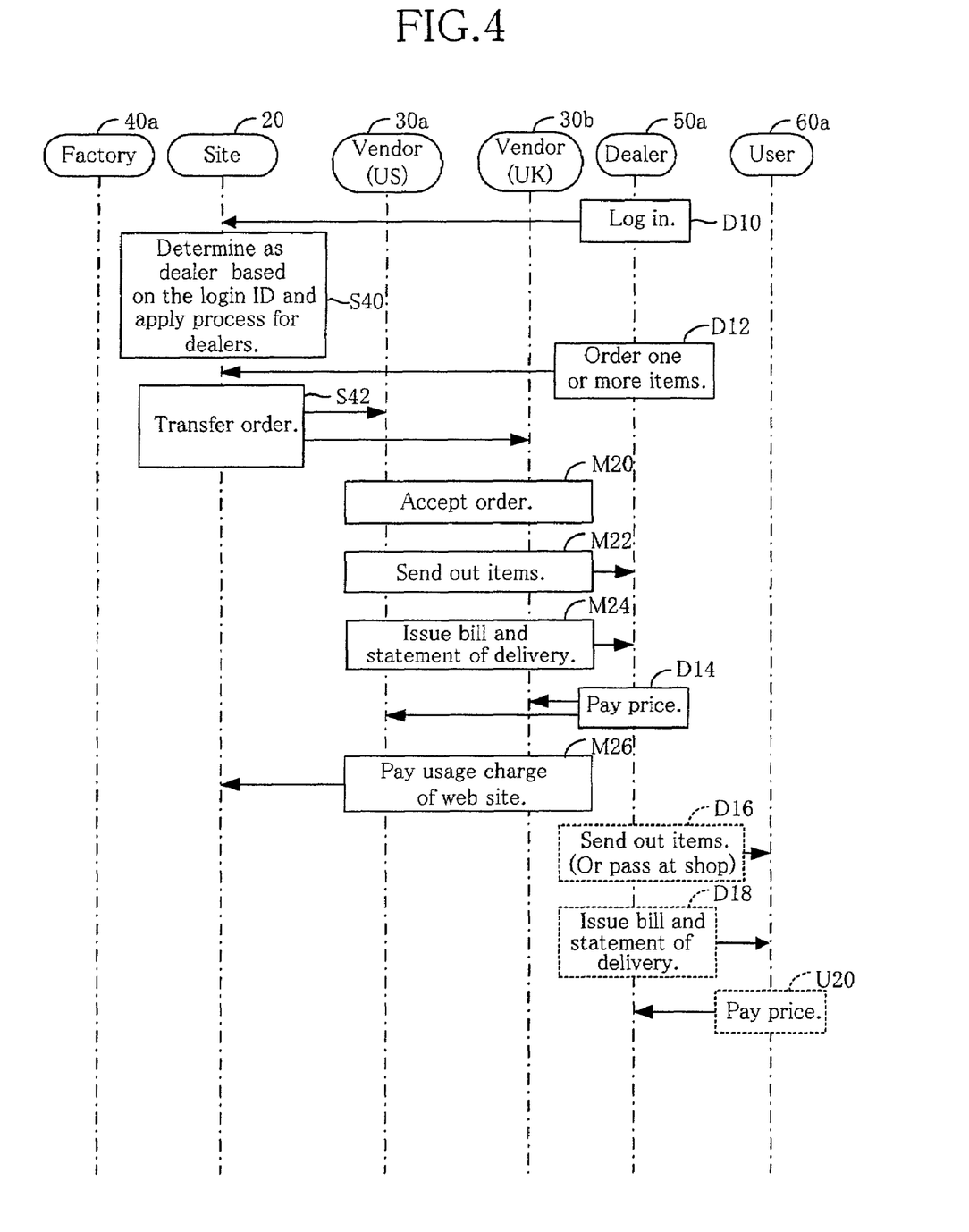
FIG. 4 is a flowchart illustrating a part of the program executed computers in FIG. 1.

In particular, in each of the external memories 118 of the computers 20, 30a, 30b. . . , 40a, 40b. . . , 50a, 50b. . . , 60a, 60b, 60c. . . is stored a program necessary to purchase or sell items corresponding to the flowcharts shown in FIG. 3 and FIG. 4. In the external memory 118 of the site computer 20 are also stored not only download items (so-called soft items) to be sold such as audio or acoustic data corresponding to musical components, automatic playing data (MIDI data) representing musical components, musical score data representing musical scores but also a list of all the physical items which are dealt in at the site, the vendors thereof and information on the items, etc.

To the bus 100 are connected a printer 120, input devices 130 such as a keyboard and a mouse, and a display 140 through an input-output interface 122, a detection circuit 132 and a display circuit 142, respectively.

To the bus 100 are also connected a communication interface 150 and a MIDI interface 160. The communication interface 150 is connected to a line of the Internet 10. To the MIDI interface 160, MIDI devices 162 such as a keyboard device, an electronic musical instrument and a sequencer can be connected.

To the bus 100 are also connected a sound generating circuit 170 for forming music signals corresponding to inputted playing information and an effect circuit 172 for adding musical effects to the formed music signals. The music signals formed and to which effects are added are emitted from a sound system 174 comprising an amplifier, loudspeakers and so on.

The MIDI interface 160, the sound generating circuit 170 and the effect circuit 172 are not always necessary to the site computer 20, vendor computers 30*a*, 30*b*. . . , factory computers 40*a*, 40*b*. . . , and dealer computers 50*a*, 50*b*. . . , which do not have to generate music signals. The printer 120 is not always necessary to the site computer 20 and the vendor computers 30*a*, 30*b*. . . , which do not have to print out items such as musical scores.

Next, the operation of the system for selling items constructed as above will be described according to the flowcharts in FIG. 3 and FIG. 4. Each of FIG. 3 and FIG. 4, taking as an example a case of a site computer 20, vender computers 30*a* and 30*b* disposed in the US and the UK, respectively, a factory computer 40*a* corresponding to the vendor computer 30*a*, a dealer computer 50*a* and a user computer 60*a*, shows a flowchart of the program executed by them.

First, a case where a general user purchases items will be described. Using the user computer 60*a*, the general user has the same log in the site computer 20 in step U10. The site computer 20 determines that the login is a login from the user computer 60*a* based on the identification data ID of the loggedin computer and applies a processing program for general users in step S10. A login from a user computer 60*a* herein means the login in which the login ID used to log in the site computer 20 is a login ID for a general user irrespective of the physical type of the computer. For example, when a general user logs in the site computer 20 with a login ID for a general user using a computer disposed at a dealer's shop, it is recognized as a user computer 60*a*. On the other hand, when a general user logs in the site computer 20 with a login ID for a dealer using the same computer, it is recognized as a dealer computer 50*a*.

Figure 5:
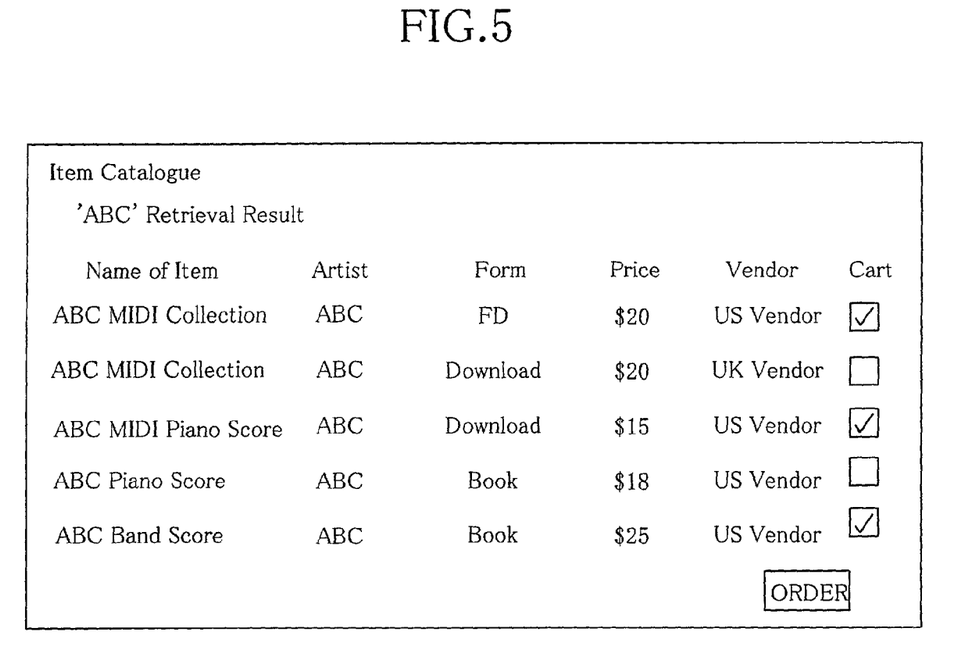
FIG. 5 is an example of a catalogue displayed on the displays of the user computers and the dealer computers in FIG. 1 at a time of ordering items.

Following the login, the user computer 60*a* places an order of one or more items through communication with the site computer 20 in step U12. In the order, the general user directly designates the items to be purchased or retrieves the items by various conditions to designate items to be purchased. FIG. 5 illustrates an example of a catalog displayed on the display 140 of the user computer 60*a* as a result of retrieval of items by an artist ABC. In the catalog are displayed the names of the items such as a collection of MIDI music, a piano score, a band score, the form of the items showing whether it is a physical item or a download item, the prices, the name of the countries to which the venders belong and so on. What is noteworthy here is that items dealt in by vendors belonging to different countries are displayed together and items in different forms are also displayed together. The name of the country may be omitted, and information on the vendors such as the name may be displayed in place of or in addition to it.

Then the general user marks in the cart columns of the items to be purchased using the input device 130 and clicks on the order button on the screen. When the order is placed as above, the site computer 20 accepts the order of the designated items in step S12 and determines whether any download items are included in the items designated by the general user or not in step S14. If no download item is included in the designated items, the site computer 20 determines 'NO' in step S14 and advances to step S20.

If any download items are included in the designated items, the site computer 20 determines 'YES' in step S14 and delivers all the download items online and downloads the items to the user computer 60*a*.

In this case, if the download item is a collection of MIDI music, the general user can store it in the external memory 118 of the user computer 60*a* and play it back (automatic playing) at any time using the sound generating circuit 170.

If the download item is a piano score (electronic musical score data), the general user can store it in the external memory 118 of the user computer 60*a* and display it on the display 140 at any time or print it on papers using the printer 120 to use it.

After the process in step S16, the site computer 20 executes a process for paying royalty to the vendor computers 30*a* and 30*b* of the vendors to which the sold download items belong in step S18. Actual payment and receipt of money may be made at the time of each dealing, but it is advisable that a total of royalties in given period of time, for example one month, is paid from the owner of the site computer 20 to the vendors to which the vendor computers 30*a* and 30*b* belong. The payment of the price for the download items from the general user to the owner of the site computer 20 is made together with that for physical items through a hereinafter described process in step S34 and U14.

Figure 6:
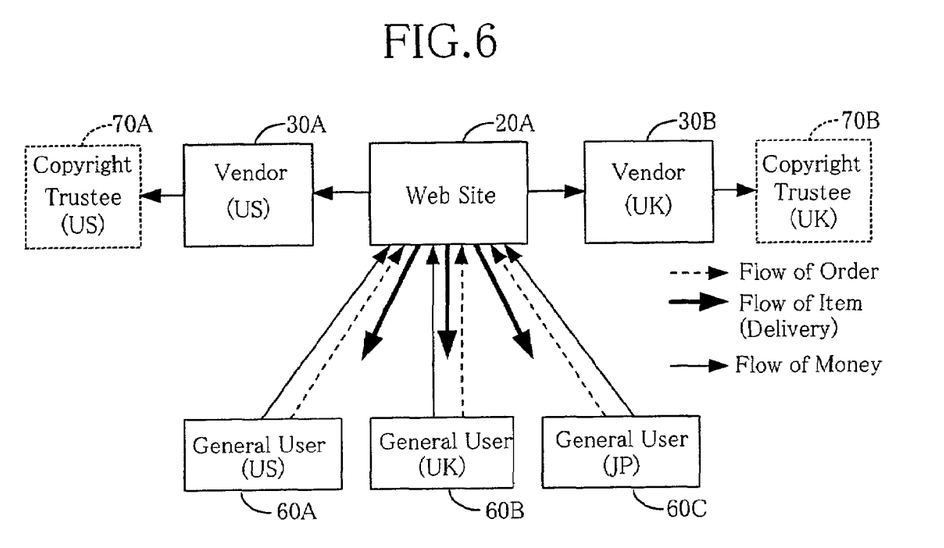
FIG. 6 is a function block diagram in a case where general users purchases download items.

FIG. 6 is a function block diagram illustrating flows of orders, items and money in a case where general users purchase download items. In FIG. 6 and hereinafter described FIG. 7 to FIG. 9, each of the blocks 20A, 30A, 30B, 40A, 40B, 50A, 60A, 60B and 60C represents a body, a organization or an owner to which a site computer 20, vendor computers 30*a*, 30*b*, factory computers 40*a*, 40*b*, dealer computers 50*a*, 50*b*, user computers 60*a*, 60*b*, 60*c* belongs, respectively. The flows of orders, items and money are shown by dashed lines, thick solid lines and thin solid lines, respectively.

The function block diagram in FIG. 6 shows that, in the case where the general users 60A, 60B, 60C purchase download items, when the general users 60A, 60B, 60C place an order with the web site 20A for the items, the ordered items are directly delivered online to the general users 60A, 60B, 60C from the web site 20A. It also shows that the prices for the items are paid to the web site 20A from the general users 60A, 60B, 60C and that the royalties are paid from the web site 20A to the vendors 30A, 30B. This is the case where there are trustees of copyrights 70A, 70B taking charge of copyrights of the items in each country and, it is advisable that the vendors 30A, 30B execute the payment of the royalties to the trustees of copyrights 70A, 70B and the procedures therefor when any copyrights relate to the sales of the items. It is also advisable that the vendor computers 30*a*, 30*b* execute the procedure for payment of the royalties through communication with computers belonging to the trustees of copyrights.

After the processes in steps S14 to S18, the site computer 20 determines whether any physical items are included or not in the items designated by the general user in step S20. If no physical item is included in the designated items, the site computer 20 determines 'NO' in step S20 and advances to step S34.

If any physical items are included in the designated items, the site computer 20 determines 'YES' in step S20 and communicates with the vendor computers 30*a*, 30*b* to confirm whether the vendors have the designated physical items in stock or not in step S22. In the external memory 118 of each of the vendor computers 30*a*, 30*b* are stored data on physical items dealt in by the vendor and the data on stocks of the physical items are constantly updated by a not shown program.

When it turned out that the vendor has the items designated by the general user in stock as a result of the stock confirmation, the site computer 20 determines 'YES' in step S24 and advances to step S26. In step S26 the site computer 20 instructs the vendor computers 30*a*, 30*b* to send out the designated items to the general user. Thus, the vendor computers 30a, 30b receive the instruction of sending out the items and execute a process for sending out the items in step M10. Then the vendors send out the designated items to the general user by delivery service or post. Thereby, the general user can immediately obtain the designated physical items directly from the various vendors, even from vendors in different countries.

After the above process for sending out the items, the vendor computers 30a, 30b execute a process for issuing a bill and a statement of delivery to the site computer 20 in step M12. The site computer 20 receives the issued bill and statement of delivery and executes a process for paying the price for the items to the vendor computers 30a, 30b according to the bill in step S28. It is advisable that the payment of the price for the items is also made in one lump sum every given period of time as is the case with the process for paying the royalties.

After the process in step S28, the site computer 20 executes a process for issuing a bill and a statement of delivery for all of the items designated by the general user to the user computer 60a in step S34, including the case where no physical item was designated by the general user and the site computer determined 'NO' in step S20. The user computer 60a receives the issued bill and statement of delivery and executes a process for paying the price for the items to the site computer 20 according to the bill in step U14. Actual payment is made by credit card, direct debit, bank transfer and so on.

Figure 7:
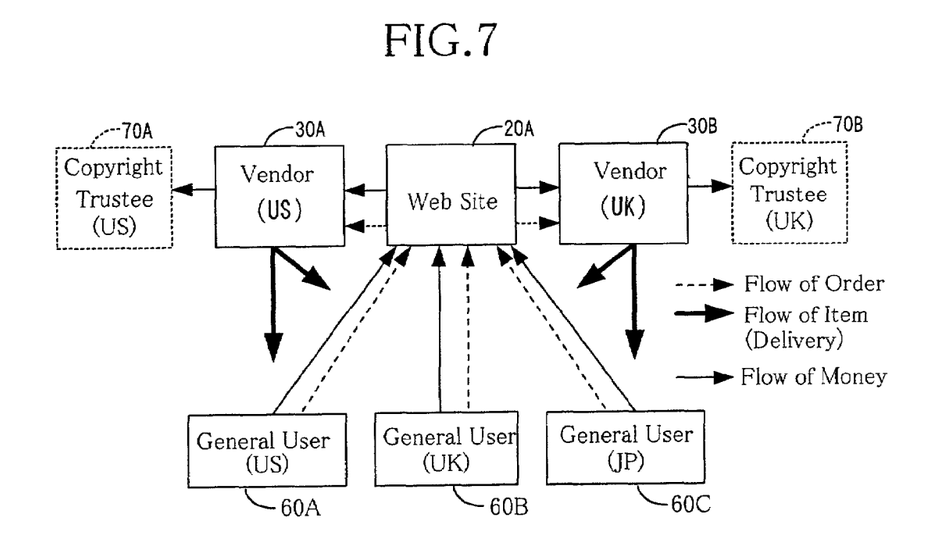
FIG. 7 is a function block diagram in a case where general users purchases physical items.

FIG. 7 is a function block diagram illustrating flows of orders, items and money in the case where general users purchase physical items. The function block diagram in FIG. 7 shows that, in the case where general users 60A, 60B, 60C purchase physical items, when the general users 60A, 60B, 60C place an order with the web site 20A for items, the web site 20A instructs the vendors 30A, 30B to send out the ordered items, which are directly delivered to the general users 60A, 60B, 60C from the vendors 30A, 30B. It also shows that the prices for the items are paid from the general users 60A, 60B, 60C to the web site 20A and that the prices for the items are paid from the web site 20A to the vendors 30A, 30B. This is the case where there are trustees of copyrights 70A, 70B taking charge of copyrights of the items in each country and, it is advisable that the vendors 30A, 30B execute the payment of the royalties to the trustees of copyrights 70A, 70B and the procedures therefor as is the case with the download items when any copyrights relate to the sales of the items.

When it turned out that the vendor does not have the physical items designated by the general user as a result of the stock confirmation in step S22, the site computer determines 'NO' in step S24 and advances to step S30. In step S30, the site computer 20 instructs the factory computer 40a belonging to a maker supplying the items to the vendor to make the items.

The factory computer 40a receives the above instruction and executes a process for making the items in step F10, and the maker to which the factory computer 40a belongs makes the items. Specifically, if the items to be made are collections of MIDI music in the form of FD, the maker makes FDs in which MIDI music is stored. If the items are piano scores, the maker prints the scores of the music. Then the factory computer 40a executes a process for sending out the made items in step F12 and the maker send out the items to the general users by delivery service or post. Thereby, the general users can immediately obtain the physical items directly from a maker supplying the physical items to the vendors, even from a maker in a different country when the vendor does not have the designated items in stock.

After the instruction of making the items in step S30, the site computer 20 executes a process for paying royalties in step S32, as is the case with step S18 and executes a process for issuing a bill and a statement of delivery in step S34 as described before. The general user executes a process for paying the price for the items in step U14 as described before.

Figure 8:
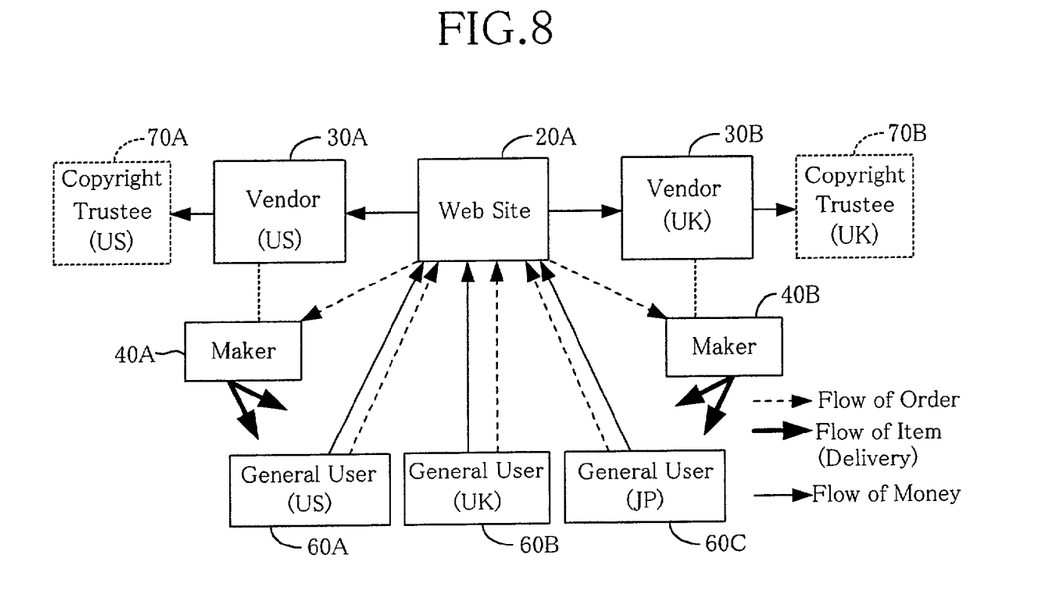
FIG. 8 is a function block diagram in a case where general users purchase physical items which a vendor does not have in stock.

FIG. 8 is a function block diagram illustrating flows of orders, items and money in the case where the physical items are out of stock. The function block diagram in FIG. 8 shows that when the general users 60A, 60B, 60C place an order with the web site 20A for physical items to purchase the physical items, the web site 20A directly instructs the makes 40A, 40B supplying the ordered items to the vendors 30A, 30B, respectively, to make the items and that the items are directly delivered from the makers 40A, 40B to the general users 60A, 60B, 60C. Payment from the general users 60A, 60B, 60C to the web site 20A and from the web site 20A to the vendor 30A, 30B are made in the same manner as the vendors have the physical items in stock. This is also the case where there are trustees of copyrights 70A, 70B taking charge of copyrights of the items in each country and, it is advisable that the vendors 30A, 30B execute the payment of the royalties to the trustees of copyrights 70A, 70B and the procedures therefor as is the case with the download items when any copyrights relate to the sales of the items.

Next, a case in which a dealer purchases items will be described. In this case, the general user may place an order with the dealer using the user computer 60a or may go to a shop of the dealer to place the order. When receiving an order from a general user as above, the dealer has the dealer computer 50a log in the site computer 20 using the dealer computer 50a in step D10. The site computer 20 determines the login is a login from a dealer computer 50a based on the identification data ID of the logged-in computer and applies a processing program for dealers in step S40.

Following the above login, the dealer computer 50a orders one or more items to the site computer 20 through communication therewith in step D12. Since the way of ordering is the same as the case where a general user places an order with the site computer 20, the description is omitted. When the dealer completes the order of the items, the site computer 20 transfers the order to the vendor computers 30a, 30b of vendors dealing in the ordered items with the information representing the order.

As a result of the above transfer, the dealer computer 50a starts communicating with the vendor computers 30a, 30b directly.

The vendor computers 30a, 30b accept the order of the items designated by the dealer based on the transferred information in step M20 and executes a process for sending out the ordered items in step M22. Then the vendors send out the designated items to the dealer by delivery service or post. After the process in step M22, the vendor computers 30a, 30b execute a process for issuing of a bill and a statement of delivery in step M24. Meanwhile, the dealer computer 50a receives the issued bill and statement of delivery and executes a process for paying the price for the items to the vender computers 30a, 30b according to the bill in step D14. It is advisable that the payment of the price for the items is also made in one lump sum every given period of time as is the case with the process for paying the royalties.

When receiving the items as above, the dealer passes the items to the general user in exchange for the money. In the case where the dealer accepts the order through communication between the user computer 60a and the dealer computer 50a, the selling and purchasing may be made through communication between the computers 50a and 60a in step D16. In this case, the dealer executes a process for sending out the ordered item and sends it out to the general user by delivery service or post. Then the dealer computer 50a executes a process for issuing a bill and a statement of delivery in step D18 as is the case with step S34, and the user computer 60a executes a process for paying the price for the items in step U20 as is the case with S20.

In this case, the vendor computers 30a, 30b executes a process for paying a usage charge of the web site to the site computer 20 in step M26 after the process in step M24. It is advisable that the payment of the usage charge is made in one lump sum every given period of time as is the case with the process for paying royalties.

Figure 9:
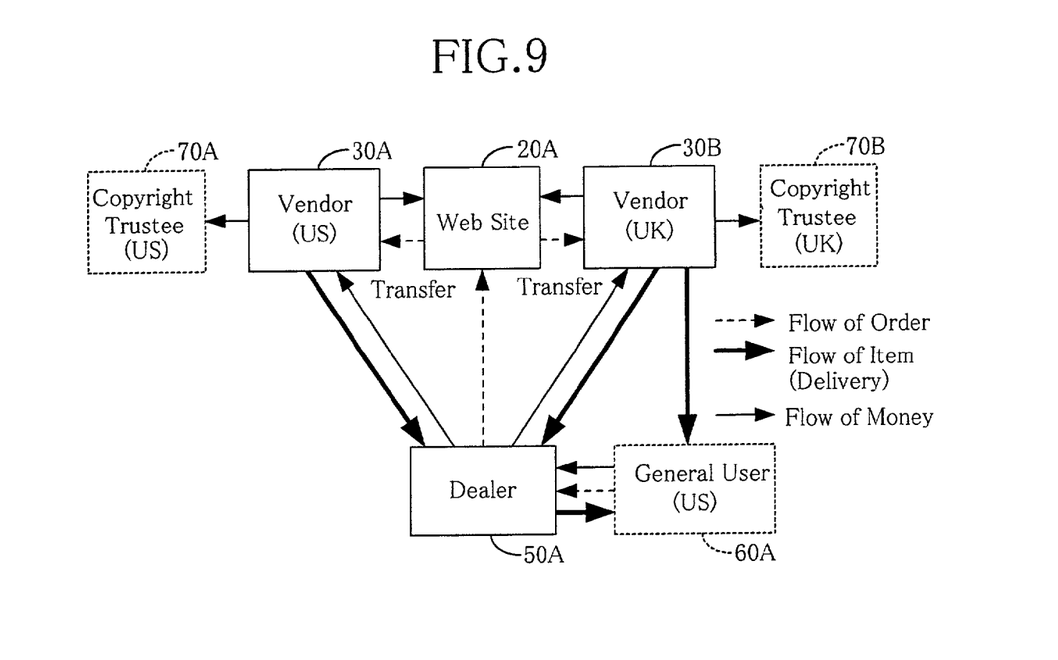
FIG. 9 is a function block diagram in a case where a dealer purchases items.

FIG. 9 is a function block diagram illustrating flows of orders, items and money in the case where a dealer purchases items using the site computer 20 as above. The function block diagram in FIG. 9 shows that, in the case where the dealer 50A purchases items, when the dealer places an order with the web site 20A for the items, the order is transferred from the web site 20A to the vendors 30A, 30B and the ordered items are directly delivered from the vendors 30A, 30B to the dealer 50A. It also shows that the prices for the items are paid from the dealer 50A to the vendors 30A, 30B and that the usage charge is paid from the vendors 30A, 30B to the web site 20A. This is also the case where there are trustees of copyrights 70A, 70B taking charge of copyrights of the items in each country and, it is advisable that the vendors 30A, 30B execute the payment of the royalties to the trustees of copyrights 70A, 70B and the procedures therefor as is the case with the download items when any copyrights relate to the sales of the items.

As is clear from the description, according to the above embodiment, the general users 60A, 60B, 60C can purchase items dealt in by a plurality of vendors 30A, 30B each belonging to different countries together at one web site 20A and the items are delivered from the plurality of vendors 30A, 30B to the general users 60A, 60B, 60C. Therefore, the general users 60A, 60B, 60C can easily purchase various items irrespective of the countries to which the vendors 30A, 30B belong without delay.

Also, the general users 60A, 60B, 60C can purchase a physical item and a download item together at one web site 20A, and can have the download item downloaded at once and have the physical item delivered from the vendors 30A, 30B. Therefore, the general users 60A, 60B, 60C can easily purchase items in various forms irrespective of the form thereof, and can immediately obtain download items in particular.

Moreover, orders from the general users 60A, 60B, 60C and dealer 50A can be dealt with at one web site 20A, and orders from the general users 60A, 60B, 60C are accepted at the web site 20A and orders from the dealer 50A are transferred to the vendors 30A, 30B. Therefore, the dealer 50A can easily order items at the web site 20A even though the vendor 30A, 30B do not set up another web site for the dealer 50A, and the web site 20A can also expect a lot of orders from the dealer 50A.

Further, when the vendor 30A, 30B do not have the ordered physical items in stock, the web site 20A places orders at once directly with the makers 40A, 40B who can make the items. Therefore, the time taken to deliver the items to the general users 60A, 60B, 60C is shortened and the general users 60A, 60B, 60C can obtain various items without waiting for a long time until the items arrive.

Figure 10:
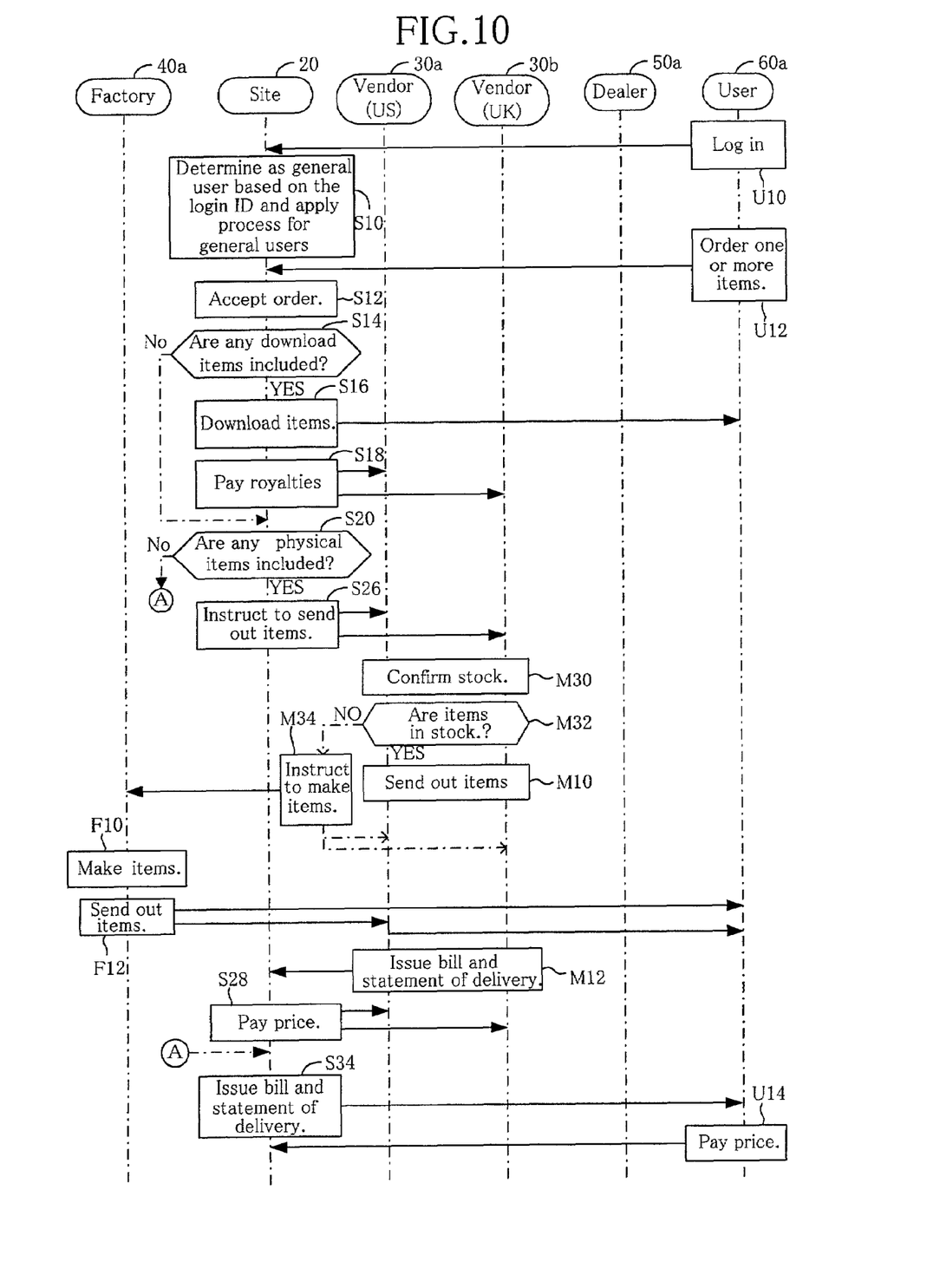
FIG. 10 is a flowchart illustrating a program according to a modified embodiment, wherein is modified a part of the program in FIG. 3.

In the above embodiment, the site computer 20 executes the stock confirmation and the instruction of making the item to the factory computer 40a in the case where the item is out of stock. However, the vendor computers 30a, 30b may execute the confirmation and the instruction instead as shown in FIG. 10. Namely, when the site computer 20 determines that the physical items are included in step S20 in FIG. 10, the site computer 20 may instruct directly to the vendor computers 30a, 30b to send out the items in step S26 as above at once without confirming the stock.

Meanwhile, the vendor computers 30a, 30b confirm whether the physical items is in stock or not in response to the instruction of sending out the items in step M30 based on the data on the physical items stored in the external memory 118 of the vendor computers 30a, 30b. When the items are in stock, the vendor computers 30a, 30b determines 'YES' in step M32 and execute a process for sending out the items, as is the case with the above embodiment. Thereby, the items are delivered from the vendor to the general user. The processes for issuing a bill and a statement of delivery, paying the price for the items are the same as the above embodiment.

When the physical items designated by the general user turned out to be out of stock as a result of the stock confirmation in step M30, the vendor computers 30a, 30b determine 'NO' in step M32 and advance to step M34. In step M34, the vendor computers 30a, 30b instruct the factory computer 40a belonging to a maker supplying the items to the vendors to make the items. In response to that, the factory computer 40a executes a process for making the items in step F10 and executes a process for sending out the items in step F12. Then the maker sends out the items either directly or through the vendor from whom the instruction of making the items received to the general user. For example, if the maker is a part of the vendor and exists in the same place, it is advisable that the items are delivered through the vendor. If the maker and the vendor are in different places, it is advisable that the items are sent out directly from the maker. In this case, the processes for issuing a bill and a statement of delivery, paying the price for the item are the same as the above embodiment.

Figure 11:
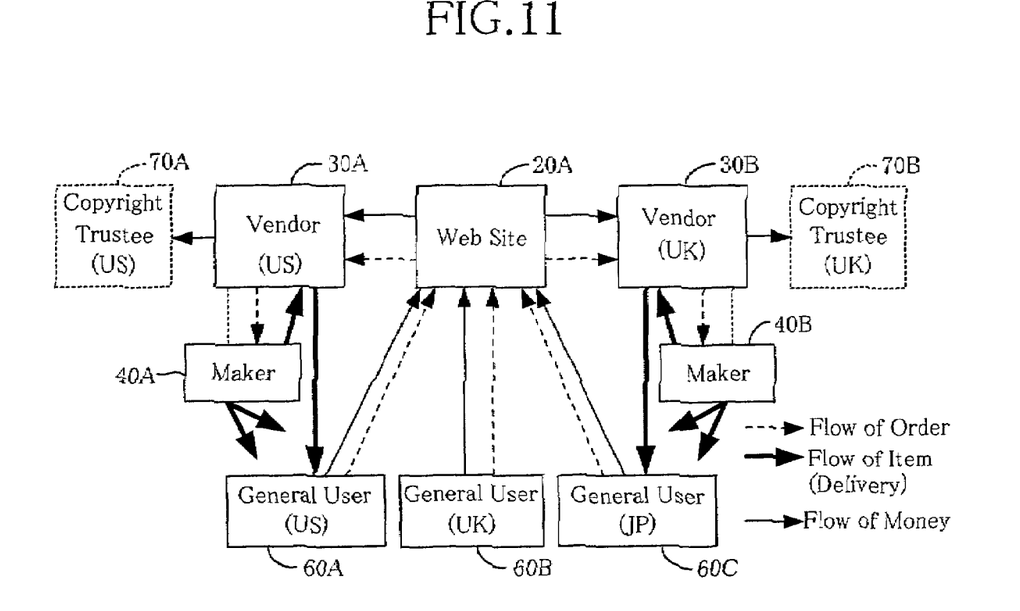
FIG. 11 is a function block diagram of a modified embodiment in a case where general users purchase physical items which vendors do not have in stock.

FIG. 11 is a function block diagram illustrating flows of orders, items and money in the case where the physical items are out of stock. The function block diagram in FIG. 11 shows that when the general users 60A, 60B, 60C place an order with the web site 20A in order to purchase the physical items, the order is transferred through the web site 20A to the vendors 30A, 30B, the vendors 30A, 30B instruct the makers 40A, 40B to make and send out the ordered items, and the ordered items are sent out from the makers 40A, 40B or the vendors 30A, 30B to the general users 60A, 60B, 60C. Payment of the price for the items from the general users 60A, 60B, 60C to the web site 20A and from the web site 20A to the vendors 30A, 30B are made as in the case of the above embodiment. This is also the case where there are copyrights trustees 70A, 70B taking charge of copyrights in each country and it is advisable that the vendors 30A, 30B execute a process for paying royalties to the copyrights trustees 70A, 70B and procedures therefor as in the case of the above embodiment when any copyrights relate to the sales of the items.

Thereby, the time taken to deliver the items to the general users 60A, 60B, 60C is shortened and the general users can obtain various items without waiting for a long time until the items arrive.

In the above embodiment, when the dealer 50A places an order with the vendors 30A, 30B through the web site 20A, the items are sent out to the dealer 50A. However, the items may be delivered directly to the general users 60A, 60B, 60C, or a body or a person designated by the general users 60A, 60B, 60C from the vendors 30A, 30B.

In the above embodiment and modified embodiment, when a vendor does not have physical items in stock, the site computer 20 or the vendor computers 30a, 30b automatically instruct the factory computer 40a to send out the items. However, the general users 60A, 60B, 60C may be able to opt either to wait until the designated items arrive at the vendors 30A, 30B or to instruct the factory computers 40a, 40b to send them out at once. This is because there is a case where, when the items to be made are temporal things, for example musical scores, the items have been merely printed using the printer 120 but not bound.

In the above embodiment, the items dealt in by the site computer 20 are music-related items such as musical scores and collection of MIDI music. However, the web site 20A may deal in other music-related items or any type of items.

In the above embodiment, description was made on the assumption that the vendors 30A and 30B are in the United States and the United Kingdom, respectively. However, the vendors may be in any country as long as they are in a plurality of countries or may be in more than two countries.

The above embodiment is one example of the present invention and it will be understood that various modification may be made without departing from the object and the spirit of the present invention.

What is claimed is:

1. A site computer connected through a network to a first vendor computer of a first vendor, a second vendor computer of a second vendor and a user computer used by a general user, the site computer comprising said site computer comprising a processor, said processor comprising
    a transmitting section for transmitting item list information for displaying an item list on one screen to the user computer, wherein the item list information shows at least one first item dealt by the first vendor, the first vendor belonging to a first country, and the name of the first country, and at least one second item dealt by the second vendor, the second vendor belonging to a second country different than the first country, and the name of the second country, the first and second items being copyrighted, whereby the user computer displays an item list based on the item list information; and
    a receiving section for receiving, from the user computer, simultaneous designation of the first and second items displayed on the item list and dealt by the first and second vendors;
    a second transmitting section for instructing a first vendor computer to send out the first item and a second vendor computer to send out the second item based on the simultaneous designation of the first and second items, whereby the first vendor computer communicates with a computer belonging to a first trustee of a copyright relating to the first item to execute the procedure for payment of a royalty, the first trustee of the copyright belonging to the first country, and the second vendor computer communicates with a computer belonging to a second trustee of a copyright relating to the second item to execute the procedure for payment of a royalty, the second trustee of the copyright belonging to the second country.

2. A site computer according to claim 1, wherein the receiving section receives bills issued for items designated simultaneously from the first and second vendor computers, and the transmitting section transmits the received bills to the user computer.

3. A site computer according to claim 1, wherein at least one designated item dealt by the first vendor is a download item.

4. A site computer according to claim 1, wherein at least one designated item dealt by the first vendor is a physical item, and the second transmitting section confirms whether the first vendor has the designated item in stock with the first vendor computer before transmitting the instruction for sending out the designated item to the first vendor computer.

5. A site computer according to claim 4, wherein a third transmission portion transmits instructions for making the designated item to a factory computer of a maker for the designated item when the first vendor does not have the designated item in stock.

6. A record medium storing a program used in a site computer connected through a network to a first vendor computer, a second vendor computer of a second vendor and a user computer used by a general user, the program containing the steps of:
    transmitting item list information for displaying an item list on one screen to the user computer, wherein the item list information shows at least one first item dealt by the first vendor, the first vendor belonging to a first country, and the name of the first country, and at least one second item dealt by the second vendor, the second vendor belonging to a second country different than the first country, and the name of the second country, the first and second items being copyrighted, whereby the user computer displays an item list based on the item list information:
    receiving, from the user computer, simultaneous designation of the first and second items displayed on the item list and dealt by the first and second vendors; and
    transmitting instructions to a first vendor computer to send out the first item and a second vendor computer to send out the second item based on the simultaneous designation of the first and second items,
    whereby the first vendor computer communicates with a computer belonging to a first trustee of a copyright relating to the first item to execute the procedure for payment of a royalty, the first trustee of the copyright belonging to the first country, and the second vendor computer communicates with a computer belonging to a second trustee of a copyright relating to the second item to execute the procedure for payment of a royalty, the second trustee of the copyright belonging to the second country.

7. A method for selling items using a site computer connected through a network to a first vendor computer of a first vendor, a second vendor computer of a second vendor and a user computer used by a general user, the site computer executing the steps of:
    transmitting item list information for displaying an item list on one screen to the user computer, wherein the item list information shows at least one first item dealt by the first vendor, the first vendor belonging to a first country, and the name of the first country, and at least one item dealt by the second vendor, the second vendor belonging to a second country different than the first country, and the name of the second country, the first and second items being copyrighted, whereby the user computer displays an item list based on the item list information:

receiving, from the user computer, simultaneous designation of the first and second items displayed on the item list and dealt by the first and second vendors; and transmitting instructions to a first vendor computer to send out the first item and a second vendor computer to send out the second item based on the simultaneous designation of the first and second items, whereby the first vendor computer communicates with a computer belonging to a first trustee of a copyright relating to the first item to execute the procedure for payment of a royalty, the first trustee of the copyright belonging to the first country, and the second vendor computer communicates with a computer belonging to a second trustee of a copyright relating to the second item to execute the procedure for payment of a royalty, the second trustee of the copyright belonging to the second country.

* * * * *